Figure 1:
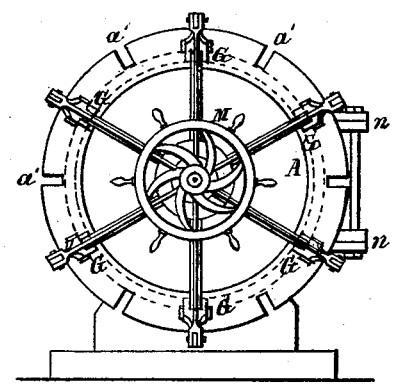
Figure 2:
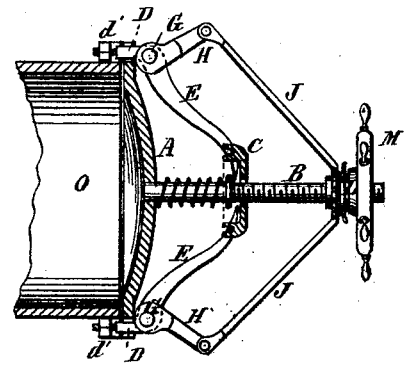
Figure 3:
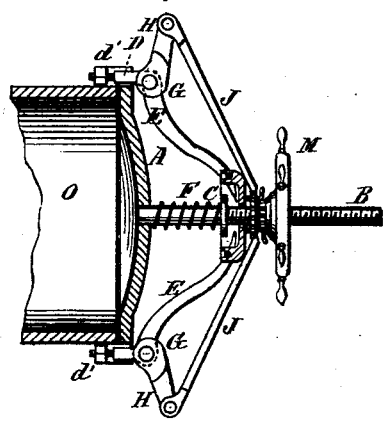
Figure 4:
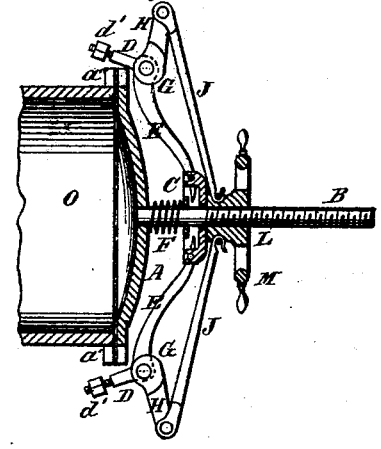

JOHN BOOTH & WILLIAM HEISER.

Improvement in Securing Reversible Boiler-Heads.

No. 128,207.                          Patented June 25, 1872.

Witnesses

B. H. Muehle
George E. Fell

Inventors

John Booth
William Heiser

UNITED STATES PATENT OFFICE.

JOHN BOOTH AND WILLIAM HEISER, OF BUFFALO, NEW YORK, ASSIGNORS TO JOHN BOOTH, OF SAME PLACE.

IMPROVEMENT IN SECURING REMOVABLE BOILER-HEADS.

Specification forming part of Letters Patent No. 128,207, dated June 25, 1872.

Specification describing an Improved Device for Securing Boiler-Heads, invented by JOHN BOOTH and WILLIAM HEISER, of the city of Buffalo, in the county of Erie and State of New York.

The first part of our invention relates to the combination of a screw-nut upon a screw-spindle projecting from the center of the boiler-head with any number of bolts required for securely holding the flanges of head and boiler together, by means of an equal number of cams and suitable connecting-rods, in such manner that by the horizontal motion of said nut upon said spindle or shaft all said bolts simultaneously may be put into place, tightened, loosened, or removed at the will of the operator. The second part of our invention relates to the combination of said bolts, by means of arms, with a central disk, which is forced from the face of the boiler-head by means of a spring, so that the horizontal motion of the disk toward the head will remove the bolts from their position within radial slots made in the periphery of the flanges of both the boiler and head, and that the action of the spring will cause the bolts to return to such position. The third part of our invention relates to the combination of the said bolts with an equal number of cams operated by and connected with a screw-nut moving horizontally upon a screw-spindle projecting from the center of the boiler-head, so that, by the said motion of said screw-nut backward or forward, the bolts will be tightened or loosened, respectively, and thereby the head either secured to the boiler or released, at the will of the operator.

Figure I is an end elevation of our improvement as attached to a boiler-head. Fig. II is a sectional elevation. Fig. III is a sectional elevation, and Fig. IV a longitudinal section, showing more clearly the operation of our invention.

A represents the head of a boiler used for drying lumber or timber. To the center of this head is attached a shaft or spindle, B, which projects horizontally from its outer face, and is provided with a screw-thread, as shown. C is a circular disk, which may be moved loosely upon said shaft. D D represent a series of bolts, which have nuts at their ends $d'$, and are connected by means of the arms E with the disk C. Each bolt is made to fit into a slot, $a'$, made in the flanges of both the head and end of the boiler. There are as many slots as there are bolts, and as many bolts as shall be required for properly and securely connecting the boiler-head. A spiral spring, F, is interposed between the face of the head A and the projecting ends of the arms E, near the center of the disk C, in such manner that the disk is forced outwardly, and thereby the bolts are held in their places within the slots $a'$. G G represent cams, which have their fulcrums upon the bolts D at their junction with the arms E. The cam-levers H are connected, by means of rods J, with a loose collar upon the screw-nut L, which is operated and moved back and forward upon the screw-spindle B by a crank or hand-wheel, M.

Operation.

It will be readily understood from the accompanying drawing that the bolts D D are simultaneously operated by the hand-wheel M and screw-nut L. In Fig. I six bolts only are shown, though the intermediate slots may also be used, if deemed necessary, to properly secure the head. In Figs. II, III, and IV only two bolts, upon diametrically opposite sides, are represented, so as to more clearly show our invention and its operation. In Figs. I and II the head is shown as securely fastened, the bolts tightened, and in their proper position.

Now, in order to release the head A so that it may be swung open upon its hinges $n$ connecting it with the main body of the boiler O, the screw-nut is turned by taking hold of the hand-wheel so as to move them in the direction of the head and disk C, the latter being retained in its position by the action of the spring F. By this movement of the screw-nut L the cams G are turned upon their centers, so as to release the bolts, as shown in Fig. III. By still further revolving and moving the screw-nut in the same direction it will force the disk C with it, compressing the spring F; thus the arms E and bolts D will swing upon their points of connection on the disk C as well as upon the ends of the rods J as fulcrums, and will be lifted out of their places within the slots $a'$ sufficiently to clear the edges of the flanges, as shown in Fig. IV, so that the head is thereby entirely disconnected from the end of the boiler. The nuts $d'$ are used for adjusting the lengths of the bolts in proportion to the size of the cams and lengths of arms and rods before the boiler-head with our improvement is used, and for readjustment whenever required.

The object of our improvement is to save time and labor in opening and closing the heads of boilers used for drying and seasoning timber and lumber; but the same may also be applied whenever it is a disideratum to accomplish this same work upon boilers for other purposes—tanks, steam-cylinders, pumps, &c.—quicker than it could be done in the old way by handling each bolt separately.

*Claims.*

We claim—

1. The combination of the screw-nut L, spindle B, and disk C with any number of bolts D, connected by means of an equal number of cams, G, arms E, and rods J, all said parts being arranged and operating substantially as herein set forth.

2. The combination of the disk C, bolts D, arms E, and spring F, arranged and operating substantially as described.

3. The combination of the bolts D with the cams G, operated by means of cam-levers I, rods J, and the screw-nut L upon the spindle B, said parts being arranged and operating substantially as herein set forth.

JOHN BOOTH.
WILLIAM HEISER.

Witnesses:
   B. H. MUEHLE,
   GEORGE E. FELL.